(No Model.)
J. F. LANDERS.
FENCE POST.
No. 261,559.　　　　　　　　　　Patented July 25, 1882.
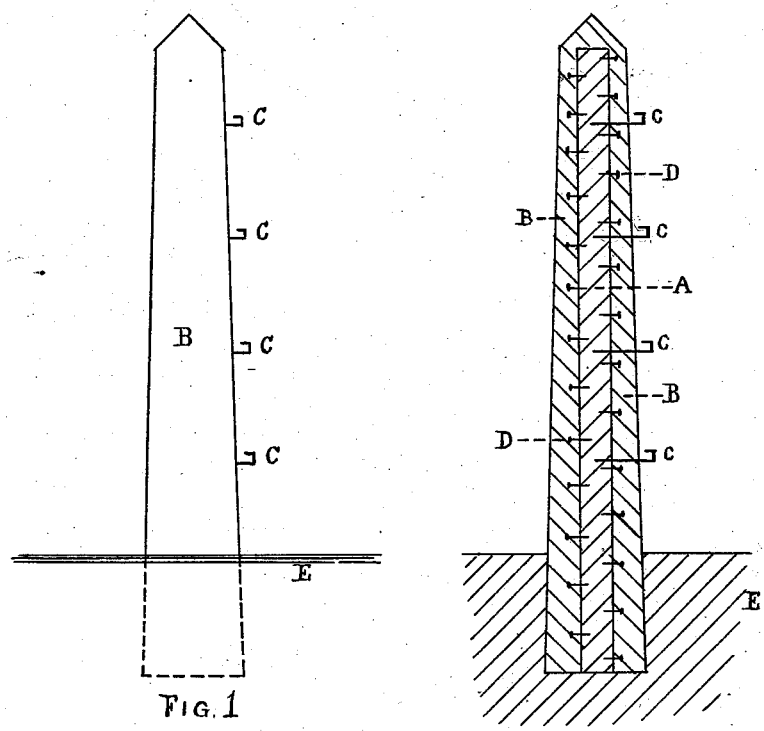
WITNESSES
INVENTOR
John F Landess

UNITED STATES PATENT OFFICE.

JOHN F. LANDERS, OF AUBURN, MASSACHUSETTS.

FENCE-POST.

SPECIFICATION forming part of Letters Patent No. 261,559, dated July 25, 1882.

Application filed April 21, 1882. (No model.)

*To all whom it may concern:*

Be it known that I, JOHN F. LANDERS, of Auburn, in the county of Worcester and Commonwealth of Massachusetts, have invented certain new and useful Improvements in Fence-Posts; and I do hereby declare the following to be a full, clear, and exact description of the invention, such as will enable others skilled in the art to make and use the same, reference being had to the accompanying drawings, which form a part of this specification, and to the letters of reference marked thereon.

The object of this invention is to produce a fence-post better than all wood or iron, as durable as stone, and at less cost than split stone or iron; and it consists in having a shaft of wood from two to three inches square, or, if round, the same in diameter, of suitable length, covered entire with a coating of hydraulic cement from one to two inches in thickness, as herein shown and described.

In the drawings, Figure 1 represents a finished post as seen set in the ground. Fig. 2 is a vertical sectional view of the same, showing its inner and outer construction.

This post is adapted for barbed or other wire fencing, and, if need be, can be made on the ground or near to where the fence is to be built.

Referring to the letters of reference in the drawings, A denotes a shaft of wood, which should be prepared either in a green or wet condition, having nails D, about the size of shingle-nails, driven into the wood about half their length. It is also furnished with hooks C, long enough to project out through the covering of cement B. The wooden shaft thus prepared is then laid in a flask or mold prepared for the size of the post to be constructed. The hydraulic cement, mixed in the usual way with clean gravel or sand and water, is then tamped or pressed round upon the shaft A and nails D, which forms an artificial-stone covering, B, with the hooks C projecting out through it, to which the wire can be secured. These hooks are made of either malleable or wrought iron.

E represents the ground in which the post is set prepared for the fencing.

The wood A is prepared green or wet in order that there may be no swelling of the fiber while the cement is hardening, and the nails serve to make the cement cleave more firmly to the wood.

The advantages in having a post made in this manner are that it is stronger and less liable to break than when made entirely of cement and sand, as artificial stone is usually made, and stronger than split or dressed stone.

Having fully described my invention, what I claim as new and desire to secure by Letters Patent, is—

A wooden shaft, A, provided with nails D and hooks C, inclosed in a coating of hydraulic cement B, the hooks projecting through the cement, to which wires may be fastened, substantially as shown and described.

Signed this the 8th day of November, A. D. 1881.

JOHN F. LANDERS.

In presence of—
  JONA LUTHER,
  M. H. COWDEN.